US007833426B2

(12) United States Patent
Clarke et al.

(10) Patent No.: US 7,833,426 B2
(45) Date of Patent: Nov. 16, 2010

(54) FEATURES IN SUBSTRATES AND METHODS OF FORMING

(75) Inventors: Leo C. Clarke, Albany, OR (US); Chris Aschoff, Corvallis, OR (US); Cary G. Addington, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 664 days.

(21) Appl. No.: 11/803,179

(22) Filed: May 11, 2007

(65) Prior Publication Data

US 2007/0210031 A1 Sep. 13, 2007

Related U.S. Application Data

(62) Division of application No. 10/817,716, filed on Mar. 31, 2004, now abandoned.

(51) Int. Cl.
*G01D 15/00* (2006.01)
*B23P 17/00* (2006.01)

(52) U.S. Cl. ........................................ 216/27; 29/890.1

(58) Field of Classification Search .................. 216/27, 216/65; 29/890.1; 156/60; 347/20; 219/121.71
See application file for complete search history.

(56) References Cited

U.S. PATENT DOCUMENTS 4,959,119 A * 9/1990 Lantzer ....................... 216/65
5,160,577 A 11/1992 Deshpande et al.
5,811,019 A 9/1998 Nakayama et al.
5,841,452 A 11/1998 Silverbrook et al.
5,999,303 A 12/1999 Drake
6,130,693 A 10/2000 Ims et al.
6,273,553 B1 8/2001 Kim et al.
6,305,782 B1 10/2001 Kishima et al.
6,368,515 B1 * 4/2002 Kaminishi et al. ............ 216/27
6,412,921 B1 7/2002 Manini
6,489,084 B1 12/2002 Pidwerbecki et al.
6,497,472 B2 12/2002 Sharma et al.
6,513,903 B2 2/2003 Sharma et al.
6,563,079 B1 5/2003 Umetsu et al.
6,572,215 B2 6/2003 Sharma
6,573,474 B1 6/2003 Loringer
6,592,205 B2 7/2003 Beerling et al.
6,962,402 B2 11/2005 Silverbrook
7,299,151 B2 * 11/2007 Braun et al. ................ 702/170

(Continued)

FOREIGN PATENT DOCUMENTS

EP 0724961 A 8/1996

(Continued)

OTHER PUBLICATIONS

Drake D J et al.; "Silicon Etched Reservoir for Bubble Control" Xerox Disclosure Journal, Xerox Corp. vol. 23 No. 5 Sep. 1998 pp. 219-221.

(Continued)

*Primary Examiner*—Nadine G Norton
*Assistant Examiner*—Patti Lin

(57) ABSTRACT

The described embodiments relate to features in substrates and methods of forming same. One exemplary embodiment can be a microdevice that includes a substrate extending between a first substrate surface and a generally opposing second substrate surface, and at least one feature formed into the first surface along a bore axis that is not transverse to the first surface.

20 Claims, 11 Drawing Sheets

U.S. PATENT DOCUMENTS

| | | | | |
|---|---|---|---|---|
| 2003/0117449 | A1 * | 6/2003 | Cahill et al. .................. | 347/7 |
| 2003/0179258 | A1 | 9/2003 | Freire et al. | |

FOREIGN PATENT DOCUMENTS

| | | | | |
|---|---|---|---|---|
| EP | 1024005 | A | | 11/1998 |
| GB | 2384752 | | | 8/2003 |
| JP | 08-267754 | | | 10/1996 |
| JP | 09-272207 | | | 10/1997 |
| JP | 10-175316 | | | 6/1998 |
| JP | 2004-082468 | | | 3/2004 |
| JP | 2004082468 | A | * | 3/2004 |
| WO | WO 02/076666 | | | 10/2002 |

OTHER PUBLICATIONS

European Search Report for Application No. EP 08075905. Report issued Feb. 13, 2009.

* cited by examiner

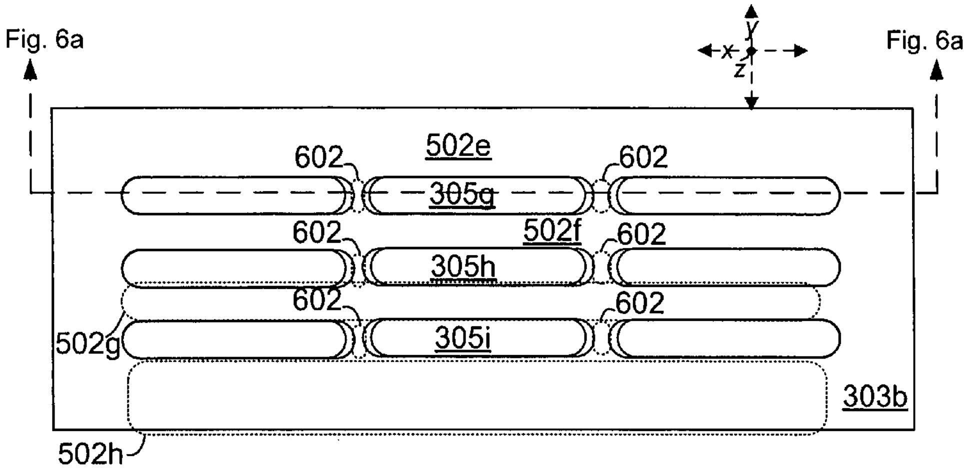
Fig. 6
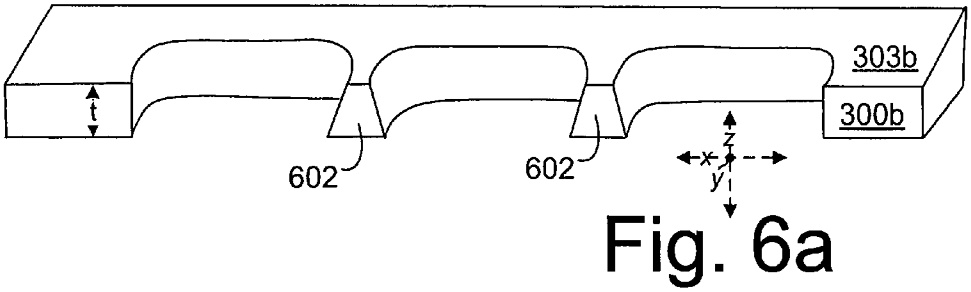
Fig. 6a
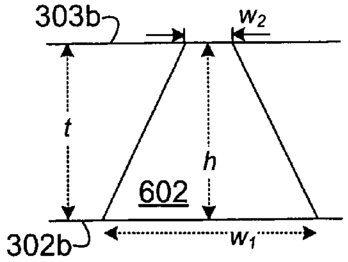
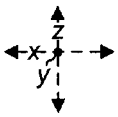
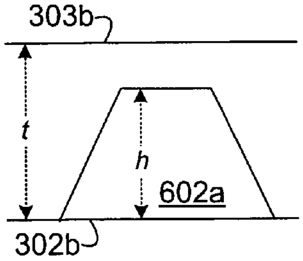
Fig. 6b
Fig. 6c

FEATURES IN SUBSTRATES AND METHODS OF FORMING

CROSS-REFERENCE TO RELATED APPLICATIONS

This is a divisional of U.S. patent application Ser. No. 10/817,716 entitled "Features in Substrates and Method of Forming," filed Mar. 31, 2004, now abandoned by Clark et al., and assigned to the present assignee.

BACKGROUND

Many microdevices include substrates having features formed therein. Existing feature shapes, dimensions, and/or orientations can limit microdevice design.

BRIEF DESCRIPTION OF THE DRAWINGS

The same components are used throughout the drawings to reference like features and components wherever feasible. Alphabetic suffixes are utilized to designate different embodiments.

FIG. 6 illustrates a diagrammatic representation of a top view of an exemplary substrate in accordance with one exemplary embodiment.

FIG. 6*a* illustrates a diagrammatic representation of a perspective cut-away view of the exemplary substrate illustrated in FIG. 6 in accordance with one exemplary embodiment.

FIG. 6*b* illustrates a diagrammatic representation of a cross-sectional view of the exemplary substrate illustrated in FIG. 6 in accordance with one exemplary embodiment.

FIG. 6*c* illustrates a diagrammatic representation of a cross-sectional view of an alternative configuration of the view represented in FIG. 6*b* in accordance with one exemplary embodiment.

DETAILED DESCRIPTION OF THE PREFERRED EMBODIMENTS

The embodiments described below pertain to methods and systems for forming features in a substrate and to microdevices incorporating such substrates. Feature(s) can have various configurations including blind features and through features. A blind feature passes through less than an entirety of the substrate's thickness. A feature which extends totally through the thickness becomes a through feature. A blind feature may be further processed into a through feature during subsequent processing steps.

Exemplary substrates having features formed therein can be utilized in various microdevices such as microchips and fluid-ejecting devices among others. Fluid-ejecting devices such as print heads are utilized in printing applications. Fluid-ejecting devices also are utilized in medical and laboratory applications among others. Exemplary substrates also can be utilized in various other applications. For example, display devices may comprise features formed into a glass substrate to create a visual display.

Several embodiments are provided below where the features comprise fluid-handling slots ("slots"). These techniques can be applicable equally to other types of features formed into a substrate.

Slotted substrates can be incorporated into fluid ejection devices such as ink jet print heads and/or print cartridges, among other uses. The various components described below may not be illustrated to scale. Rather, the included figures are intended as diagrammatic representations to illustrate to the reader various inventive principles that are described herein.

Exemplary Printing Device

Figure 1:
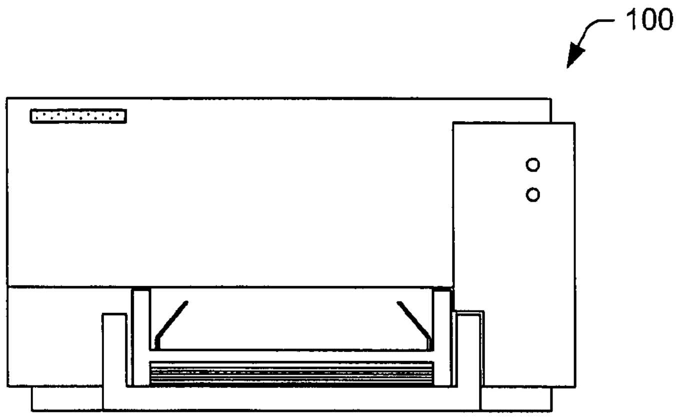
FIG. 1 illustrates a front elevational view of a diagrammatic representation of an exemplary printer in accordance with one exemplary embodiment.

FIG. 1 shows a diagrammatic representation of an exemplary printing device that can utilize an exemplary print cartridge. In this embodiment the printing device comprises a printer 100. The printer shown here is embodied in the form of an inkjet printer. The printer 100 can be capable of printing in black-and-white and/or color. The term "printing device" refers to any type of printing device and/or image forming device that employs slotted substrate(s) to achieve at least a portion of its functionality. Examples of such printing devices can include, but are not limited to, printers, facsimile machines, and photocopiers. In this exemplary printing device the slotted substrates comprise a portion of a print head which is incorporated into a print cartridge, an example of which is described below.

Exemplary Products and Methods

Figure 2:
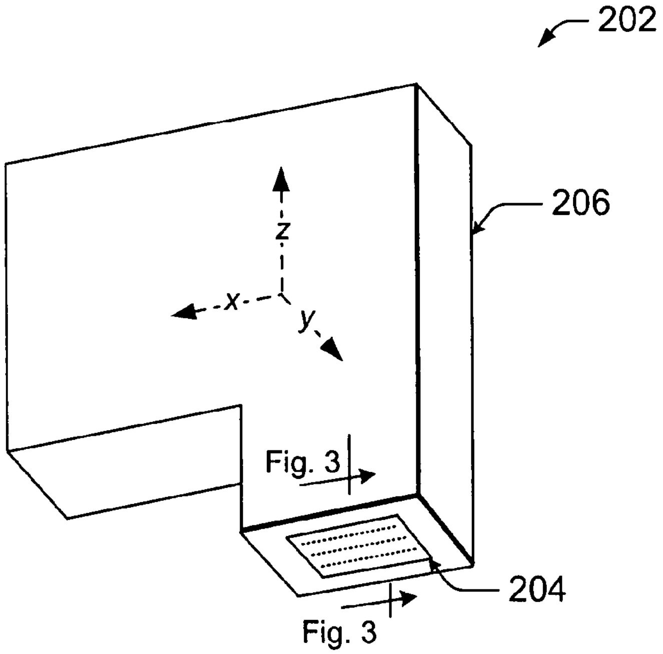
FIG. 2 illustrates a perspective view of a diagrammatic representation of a print cartridge suitable for use in the exemplary printer shown in FIG. 1 in accordance with one exemplary embodiment.

FIG. 2 shows a diagrammatic representation of an exemplary print cartridge 202 that can be utilized in an exemplary printing device. The print cartridge is comprised of a print head 204 and a cartridge body 206 that supports the print head. Though a single print head 204 is employed on this print cartridge 202 other exemplary configurations may employ multiple print heads on a single print cartridge.

Print cartridge 202 is configured to have a self-contained fluid or ink supply within cartridge body 206. Other print cartridge configurations may alternatively or additionally be configured to receive fluid from an external supply. Other exemplary configurations will be recognized by those of skill in the art. Though the term ink is utilized below, it should be understood that fluid-ejecting devices can deliver a diverse range of fluids.

Reliability of print cartridge 202 is desirable for proper functioning of printer 100. Further, failure of print cartridges during manufacture increases production costs. Print cartridge failure can result from a failure of the print cartridge components. Such component failure can be caused by cracking. As such, various embodiments described below can provide print heads with a reduced propensity to crack.

Reliability of print cartridge 202 also can be affected by bubbles contained within the print cartridge, especially within the print head 204. Among other origins, bubbles can be formed in the ink as a byproduct of operation of a printing device. For example, bubbles can be formed as a byproduct of the ejection process in the printing device's print cartridge when ink is ejected from one or more firing chambers of the print head.

If bubbles accumulate within the print head the bubbles can occlude ink flow to some or all of the firing chambers and can cause the print head to malfunction. Some embodiments can evacuate bubbles from the print head to decrease the likelihood of such a malfunction as will become apparent below.

An additional desire in designing print cartridges, is the reduction of their cost. One way to reduce such cost, is to reduce the dimensions, and therefore the material and fabrication costs, of print head 204.

Figure 3:
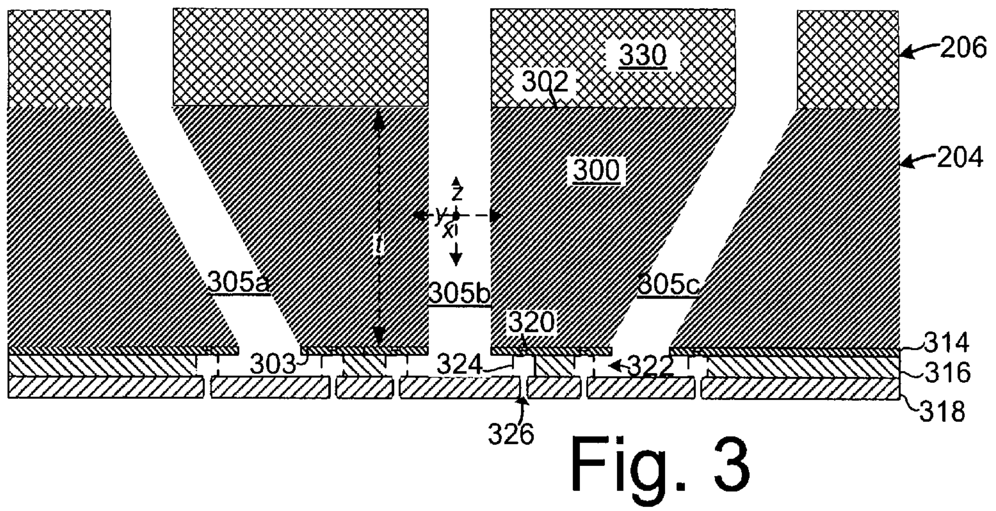
FIGS. 3-3*a* illustrate diagrammatic representations of a cross-sectional view of a portion of an exemplary print cartridge.
Figure 3A:
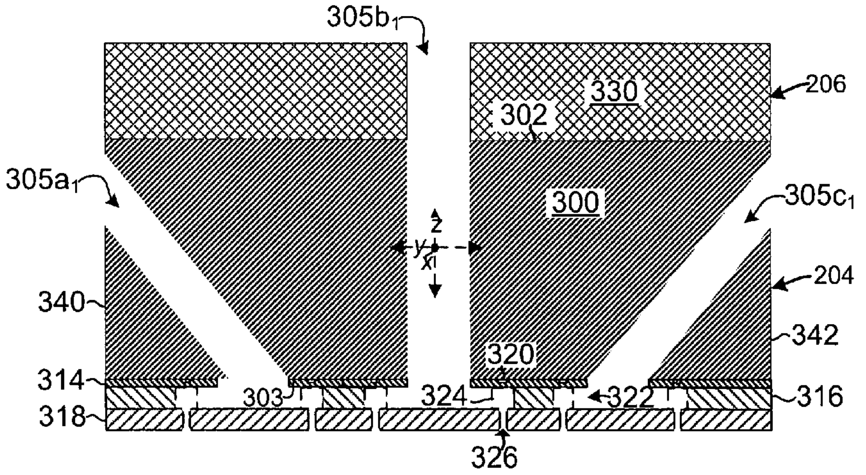

FIG. 3 illustrates a side-sectional diagrammatic representation of a portion of the exemplary print head 204 as indicated in FIG. 2. FIG. 3*a* illustrates an alternative print head configuration sometimes referred to as an edge feed configuration.

The view of FIG. 3 is taken transverse an axis normal to first substrate surface ("first surface") 302, the axis extending into and out of the plane of the page upon which FIG. 3 appears. In this particular embodiment this axis is the long axis which lies between the first and second surfaces and extends generally parallel to those surfaces. Here a substrate 300 has a thickness t which extends between a first surface 302 and a second substrate surface ("second surface") 303. In this embodiment three features 305*a-c* comprising fluid-feed slots ("slots") pass through substrate 300 between first and second surfaces 302, 303. For purposes of explanation in this embodiment the terms "slot" and "feature" are utilized interchangeably. Examples of other feature types are described below in relation to FIGS. 9*a*-9*b* and FIGS. 10*a*-10*b*.

In this particular embodiment, substrate 300 comprises silicon which either can be doped or undoped. Other substrate materials can include, but are not limited to, gallium arsenide, gallium phosphide, indium phosphide, glass, quartz, ceramic or other material.

Substrate thickness t can have any suitable dimensions that are appropriate for an intended application. In some embodiments substrate thicknesses t can range from less than 100 microns to more than 2000 microns. One exemplary embodiment can utilize a substrate that is approximately 675 microns thick. Though a single substrate is discussed herein, other suitable embodiments may comprise a substrate that has multiple layers during fabrication and/or in the finished product. For example, one such embodiment may employ a substrate having a first component and a second sacrificial component which is discarded at some point during processing.

In this particular embodiment, one or more thin-film layers 314 are positioned over substrate's second surface 303. In at least some embodiments, where substrate 300 is incorporated into a fluid ejection device, a barrier layer 316 and an orifice plate or orifice layer 318 are positioned over the thin-film layers 314.

In one embodiment one or more thin-film layers 314 can comprise one or more conductive traces (not shown) and electrical components such as transistors (not shown), and resistors 320. Individual resistors can be controlled selectively via the electrical traces. Thin-film layers 314 also can at least partially define in some embodiments, a wall or surface of multiple fluid-feed passageways 322 through which fluid can pass. Thin-film layers 314 also can comprise among others, a field or thermal oxide layer. Barrier layer 316 can define, at least in part, multiple firing chambers 324. In some embodiments fluid-feed passageways 322 may be defined in barrier layer 316, alone or in combination with thin-film layers 314. Orifice layer 318 can define multiple firing nozzles 326. Individual firing nozzles can be aligned respectively with individual firing chambers 324.

Barrier layer 316 and orifice layer 318 can be formed in any suitable manner. In one particular implementation both barrier layer 316 and orifice layer 318 comprise thick-film material, such as a photo-imagable polymer material. The photo-imagable polymer material can be applied in any suitable manner. For example, the material can be "spun-on" as will be recognized by the skilled artisan.

After being spun-on, barrier layer 316 then can be patterned to form, at least in part, desired features such as passageways and firing chambers therein. In one embodiment patterned areas of the barrier layer can be filled with a sacrificial material in what is commonly referred to as a 'lost wax' process. In this embodiment orifice layer 318 can be comprised of the same material as the barrier layer and can be formed over barrier layer 316. In one such example orifice layer material can be 'spun-on' over the barrier layer. Orifice layer 318 then can be patterned as desired to form nozzles 326 over respective chambers 324. The sacrificial material then can be removed from the barrier layer's chambers 324 and passageways 322.

In another embodiment, barrier layer 316 comprises a thick-film, while the orifice layer 318 comprises an electroformed nickel or other suitable metal material. Alternatively the orifice layer can be a polymer, such as "Kapton" or "Oriflex", with laser ablated nozzles. Other suitable embodiments may employ an orifice layer which performs the functions of both a barrier layer and an orifice layer.

A housing 330 of cartridge body 206 can be positioned over substrate's first surface 302. In some embodiments, housing 330 can comprise a polymer, ceramic and/or other suitable material(s). An adhesive, though not specifically shown, may be utilized to bond or otherwise join housing 330 to substrate 300.

In operation, a fluid, such as ink, can enter slots 305*a-c* from the cartridge body 206. Fluid then can flow through individual passageways 322 into an individual firing chamber 324. Fluid can be ejected from the firing chamber when an electrical current is passed through an individual resistor 320 or other ejection means. The electrical current can heat the resistor sufficiently to heat some of the fluid contained in the firing chamber to its boiling point so that it expands to eject a portion of the fluid from a respectively positioned nozzle 326. The ejected fluid then can be replaced by additional fluid from passageway 322.

As represented in FIG. 3*a*, slot 305$b_1$ extends between first and second surfaces 302, 303. Slots 305$a_1$, 305$c_1$ extend to second surface 303 from first and second sidewalls 340, 342 that are orthogonal or oblique to the second surface. Such a configuration may allow reduced print head die sizes to be used that provide the same functionality as larger die sizes.

Figures 4, 4A, 4B:
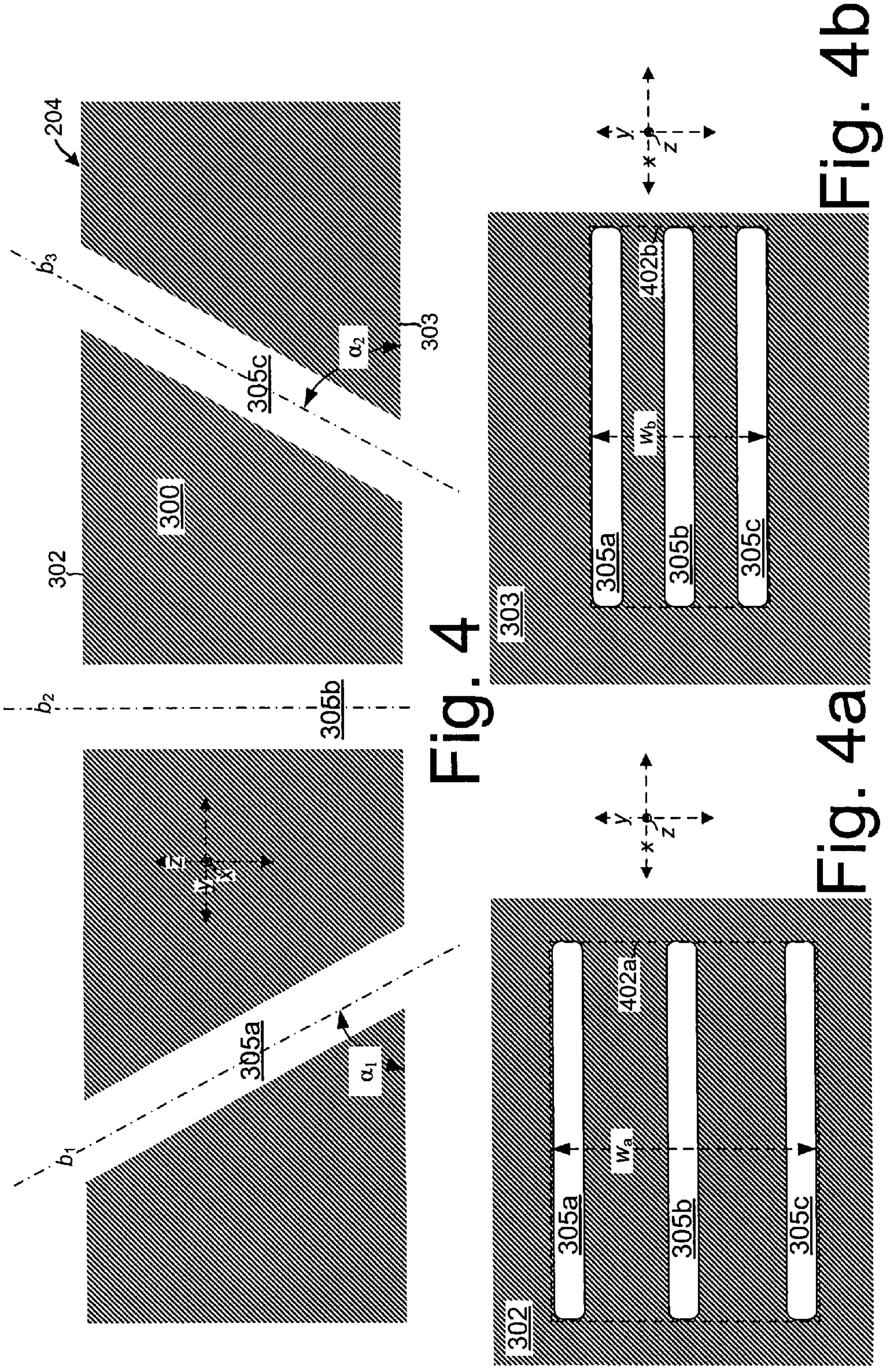
FIG. 4 illustrates a diagrammatic representation of a cross-sectional view of an exemplary substrate in accordance with one exemplary embodiment.
FIGS. 4*a*-4*b* illustrate diagrammatic representations of top and bottom views respectively of the substrate illustrated in FIG. 4 in accordance with one embodiment.

FIG. 4 illustrates a diagrammatic representation of substrate 300 illustrated in FIG. 3. In this embodiment each slot 305*a-c* extends through substrate 300 along a bore axis $b_1$, $b_2$, and $b_3$ respectively. A bore axis intersects the first and second surfaces and can generally correspond to a direction of intended fluid flow through the slot. Slot 305*b* extends along bore axis $b_2$ which is transverse to second surface 303. Slots 305*a* and 305*c* extend along bores $b_1$, $b_3$ which are not transverse to second surface 303. Individual slots 305*a*, 305*c* lie at angles $\alpha_1$, $\alpha_2$ with respect to second surface 303.

Angles $\alpha_1$, $\alpha_2$ can comprise any angle less than 90 degrees relative to second surface 303 with some embodiments having a value in the range of 10 degrees to 80 degrees. In some embodiments angles $\alpha_1$, $\alpha_2$ can range from about 60 degrees to about 80 degrees. In other embodiments angles $\alpha_1$, $\alpha_2$ can range from about 40 degrees to about 59 degrees. In still other embodiments angles $\alpha_1$, $\alpha_2$ can range from about 20 degrees to about 39 degrees. In this particular embodiment angles $\alpha_1$, $\alpha_2$ each comprise about 62 degrees, another particular embodiment has angles of about 45 degrees. Though in this embodiment angles $\alpha_1$, $\alpha_2$ comprise similar values, other embodiments may have dissimilar values. For example in an alternative embodiment angle $\alpha_1$ can have a value of 45 degrees while angle $\alpha_2$ has a value of 55 degrees. Having one or more angled slots can allow greater options in print cartridge design, as well in the design of other microdevices, as will be described in more detail below.

In this embodiment slots 305*a*, 305*c* are angled relative the second surface 303 when viewed transverse the long axis. Alternatively or additionally, other embodiments may be angled relative to second surface 303 when viewed along the long axis. Examples of such a configuration will be described in more detail below in relation to FIGS. 8-8*b*. Embodiments having one or more angled slots can allow greater design flexibility. For example, angled slots can allow a first geometry at first surface 302 and a second different geometry at second surface 303.

FIGS. 4*a* and 4*b* illustrate top views of substrate's first surface 302 and second surface 303 respectively. In this embodiment slots 305*a*-305*c* define a first footprint 402*a* at first surface 302 and a second different footprint 402*b* at second surface 303. First footprint 402*a* defines a first area while second footprint 402*b* defines a second area. In some embodiments the first area can be at least about 10 percent greater than the second area. In this particular embodiment first area is about 20 percent greater than second area. Further, in this embodiment the increased area is due predominately to a greater width $w_a$ of footprint 402*a* when compared to width $w_b$ of footprint 402*b*.

Figure 5:
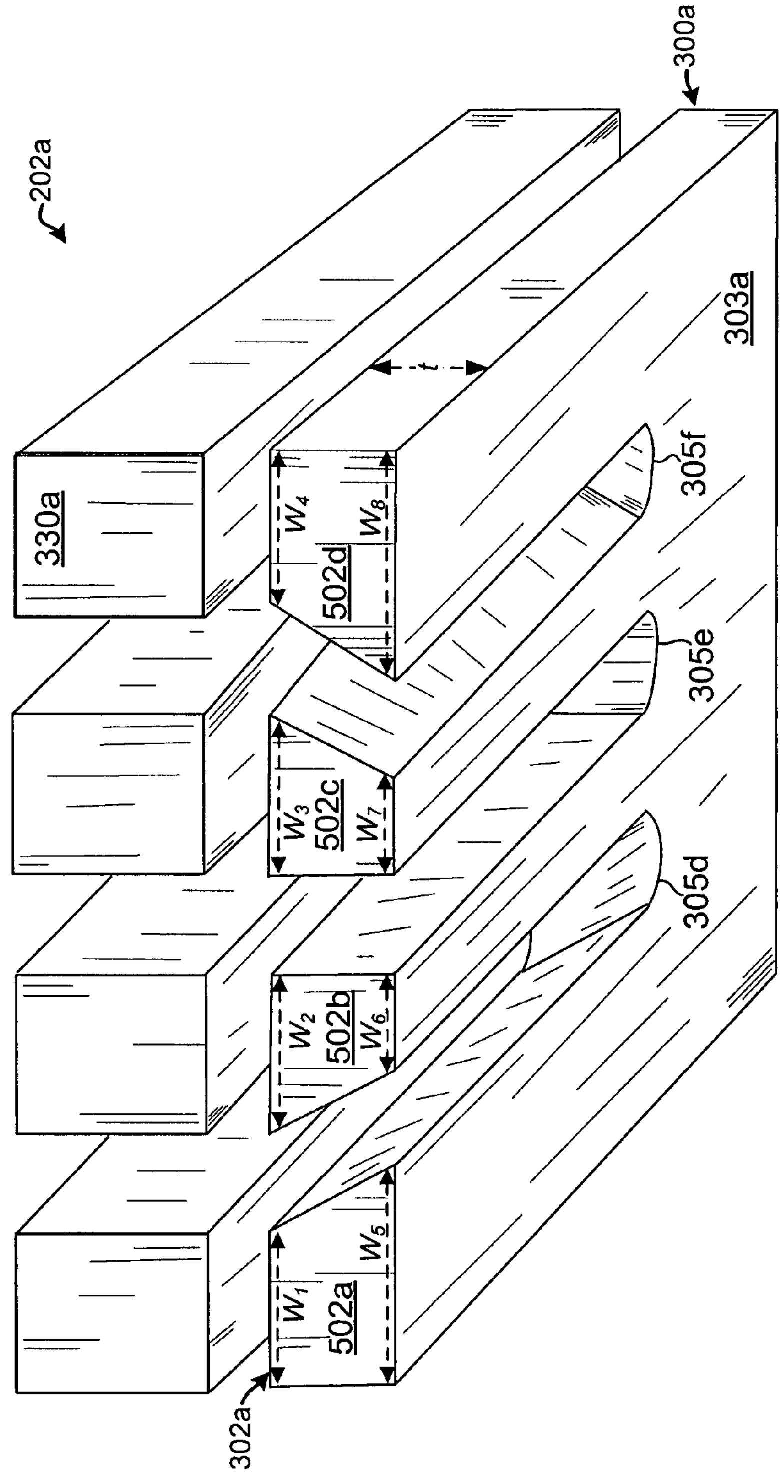
FIG. 5 illustrates a diagrammatic representation of a perspective view of a portion of a print cartridge in accordance with one exemplary embodiment.

FIG. 5 shows a cut-away perspective view of a portion of another exemplary print cartridge 202*a*. Substrate 300*a* is positioned proximate housing 330*a* in an orientation in which the two components might be bonded together to form print cartridge 202*a*. In this embodiment three slots 305*d*-305*f* are defined, at least in part, by substrate material remaining between the slots. This substrate material remaining between the slots is referred to herein as "beam(s)" 502*a*-502*d* which extend generally parallel to the long axis of the slots. Beams 502*a* and 502*d* can be referred to as external beams as they define a slot on one side and a substrate edge on the other. Similarly, beams 502*b*-502*c* can be referred to as internal beams as they define slots on two sides. Beams 502*a*-502*d* have widths $w_1$-$w_4$ respectively at first surface 302*a* as measured transverse the slots' long axes.

Some print cartridge designs achieve effective integration of substrate 300*a* with cartridge body housing 330*a* by maintaining the widest possible beam width of the substrate's narrowest beam relative to first surface 302*a*. Such a configuration can among other factors aid in molding cartridge body housing 330*a*. In this illustrated embodiment beam widths $w_1$-$w_4$ are generally equal.

Beams 502*a*-502*d* also define widths $w_5$-$w_8$ respectively at second surface 303*a* as measured transverse the slots' long axes. Some print cartridge designs configure substrate's second surface 303*a* so that external beams 502*a*, 502*d* are relatively wider than internal beams 502*b*, 502*c* to allow placement of various electrical components overlying second surface 303*a* on the external beams. As shown in FIG. 5 print head substrate 300*a* incorporating one or more angled slots can achieve both a desired first surface configuration and a desired second surface configuration. Further, internal beams 502*b*, 502*c* of substrate 300*a* are stronger and less likely to crack than a configuration where second surface widths $w_6$, $w_7$ are maintained through the substrate' thickness t.

The embodiment shown in FIG. 5 has generally continuous slots when viewed along the long axis. Other embodiments may have substrate material or 'ribs' extending across the substrate's long axis from a beam defining one side of a slot to another beam defining an opposing side of the slot.

FIGS. 6-6*c* illustrate one example where ribs 602 extend generally across an axis of slots 305*g*-305*i*. FIG. 6 illustrates a top view of substrate's second surface 303*b*. FIG. 6*a* illustrates a cut-away view of substrate 300*b* as indicated in FIG. 6. FIGS. 6*b*-6*c* illustrate views taken generally orthogonally to the y-axis which provide two exemplary rib configurations.

As illustrated in FIGS. 6-6*a* ribs 602 extend between beams 502*e* and 502*f*, beams 502*f* and 502*g*, and beams 502*g* and 502*h*. FIG. 6*b* illustrates rib 602 illustrated in FIG. 6*a* in a little more detail, while FIG. 6*c* comprises a view similar to that illustrated in FIG. 6*b* of another exemplary rib configuration.

FIG. 6*b* illustrates an embodiment where rib 602 tapers from a first width $w_1$ proximate first surface 302*b* to a second width $w_2$ proximate second surface 303*b*. This is but one exemplary configuration. For example other embodiments may maintain a generally uniform width between the first and second surfaces. In this instance rib 602 can approximate a frustrum. Such a configuration may supply generally uniform fluid flow to various chambers, described above, which can be supplied by slot 305*g*. Other embodiments may utilize other rib shapes. In the embodiment illustrated in FIGS. 6*a*-6*b* height h of rib 602 equals thickness t of substrate 300*b*.

FIG. 6*c* illustrates an alternative configuration where rib height h is less than thickness t. In this particular instance rib 602*a* extends from first surface 302*b* but does not reach second surface 303*b*. Configurations which utilize a height h less than thickness t may contribute to a uniform fluid environment for various chambers supplied by slot 305*g*.

Figure 7:
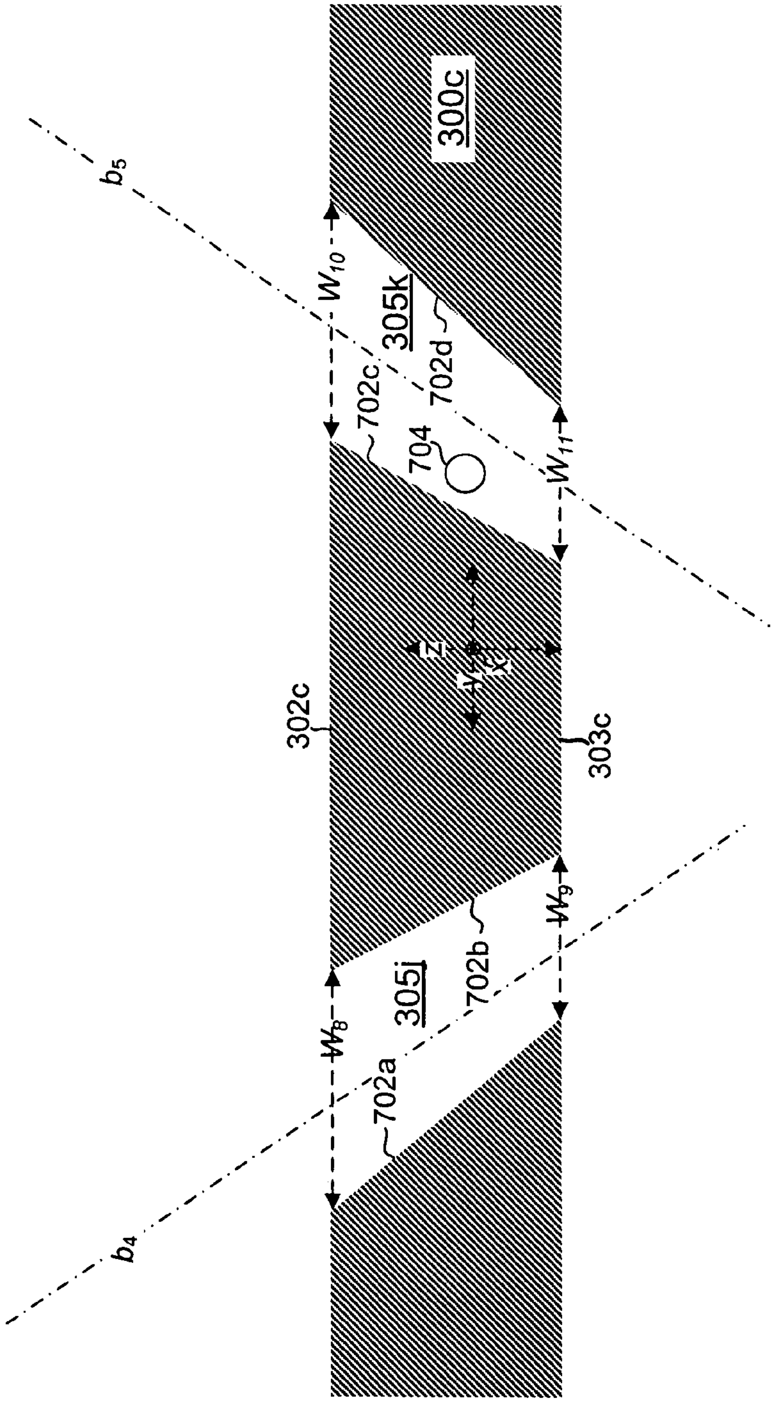
FIG. 7 illustrates a diagrammatic representation of a cross-sectional view of an exemplary substrate in accordance with one exemplary embodiment.

FIG. 7 illustrates a cross-sectional representation of another exemplary substrate 300*c*. This cross-sectional view is similar to the view illustrated in FIG. 4 and is transverse the long axis. Two slots 305*j*, 305*k* extend through substrate 300*c* along bores $b_4$, $b_5$ respectively which are not transverse to first surface 302*c*. In this instance bores $b_4$, $b_5$ intersect midpoints of widths $w_8$, $w_9$ and $w_{10}$, $w_{11}$ respectively.

In this embodiment slot 305*j* is defined, at least in part, by a first sidewall 702*a* and a second sidewall 702*b*. Similarly, slot 305*k* is defined, at least in part, by a first sidewall 702*c* and a second sidewall 702*d*.

During operation of a print cartridge incorporating substrate 300*c* bubbles may occur. Some of the described embodiments can allow a bubble to evacuate more readily from the print head compared to a traditional print head design. In this particular embodiment, a bubble is indicated generally at 704. Buoyancy forces acting upon bubble 704 are directed along the z-axis. Fluid flow along bore $b_5$ can be represented as a vector having both y-axis and z-axis components. Generally only the z-axis component of the fluid flow acts against the bubble's buoyancy forces and the bubble is more likely to migrate toward first surface 302*c* and ultimately from the slot. In some instances bubble 704 may migrate toward first sidewall 702*c* and then up the first sidewall toward first surface 302*c*.

Where multiple bubbles occur the bubbles may migrate toward and up first sidewall 702*c*. Following a common path may tend to force the bubbles together leading to agglomeration. If the bubbles agglomerate they may pass out of the slot more quickly than they otherwise would. Agglomeration may assist with bubble removal because the buoyant force acts to move the bubble upwards against the ink flow. This buoyant force may become increasingly dominant as the bubbles agglomerate and grow because it increases with the cube of the bubble diameter whereas the drag force induced by the downward ink flow increases only with the square of the bubble diameter.

As represented in FIG. 7 width $w_8$ of slot 305*j* at first surface 302*c* is greater than width $w_9$ at second surface 303*c*. Similarly, width $w_{10}$ of slot 305*k* at first surface 302*c* is greater than width $w_{11}$ at second surface 303*c*. In this embodiment slots 305*j*, 305*k* have a slot profile which generally increases from second surface 303*c* toward first surface 302*c*. As such if bubble 704 has a volume sufficient to contact both sidewalls 702*c*, 702*d* simultaneously the less constrictive width environment progressively available toward first surface 302*c* can provide a driving force to move bubble 704 toward the first surface 302*c* and ultimately out of the print head.

Figure 8:
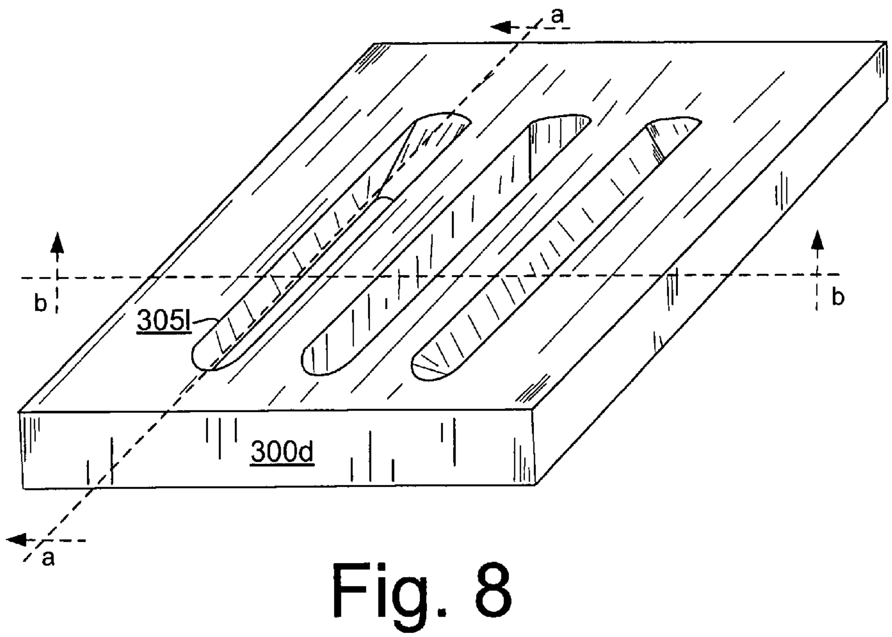
FIG. 8 illustrates a diagrammatic representation of a perspective view of an exemplary substrate in accordance with one exemplary embodiment.
Figure 8A:
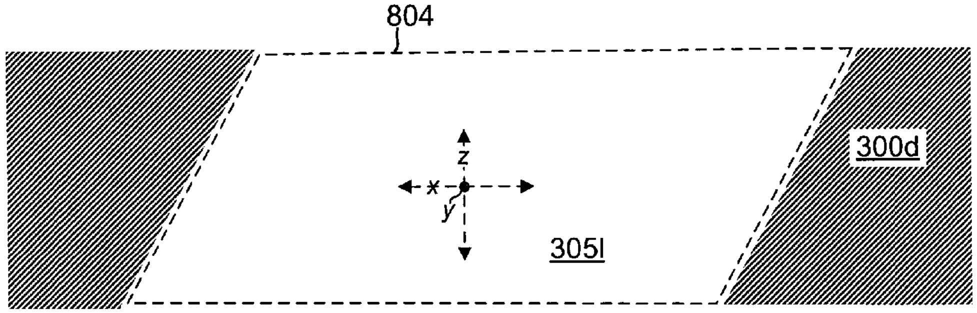
FIGS. 8*a*-8*b* illustrate a diagrammatic representation of cross-sectional views of an exemplary substrate in accordance with one exemplary embodiment.
Figure 8B:
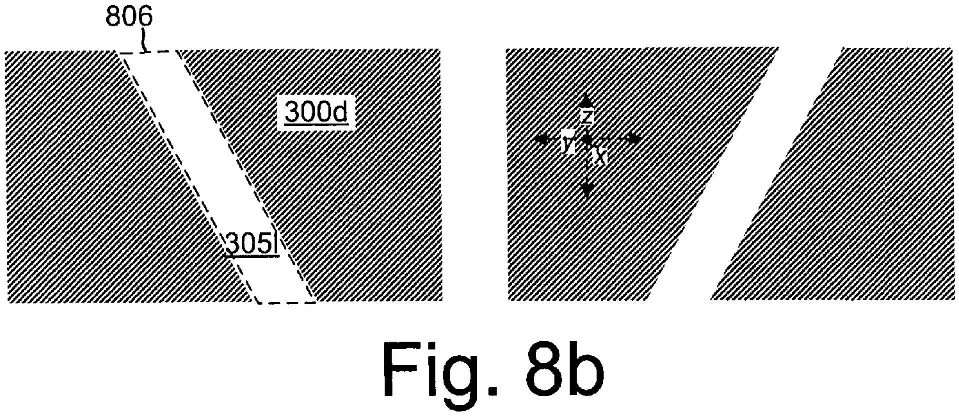

FIGS. 8-8*b* represent another substrate 300*d*. FIG. 8 represents a perspective view, while FIG. 8*a* represents a cross-sectional view taken along line a-a indicated in FIG. 8 and FIG. 8*b* represents a cross-sectional view taken along line b-b. In this embodiment line a-a is generally parallel to a long axis of slot 305*l* and line b-b is generally orthogonal the long axis.

In this embodiment, when viewed along its long axis slot 305*l* generally approximates a portion of a parallelogram 804 as best can be appreciated from FIG. 8*a*. Also, in this particular embodiment slot 305*l* approximates a portion of a parallelogram 806 when viewed transverse the long axis as best can be appreciated from FIG. 8*b*. Other slots can approximate other geometric shapes. Various slot shapes can allow increased flexibility of print head design over standard slot configurations.

FIGS. 9*a*-9*b* and 10*a*-10*b* represent exemplary features and process steps for forming the features. In these two embodiments the term feature is employed. The feature may be a bind feature or a through feature comprising a slot.

Figure 9A:
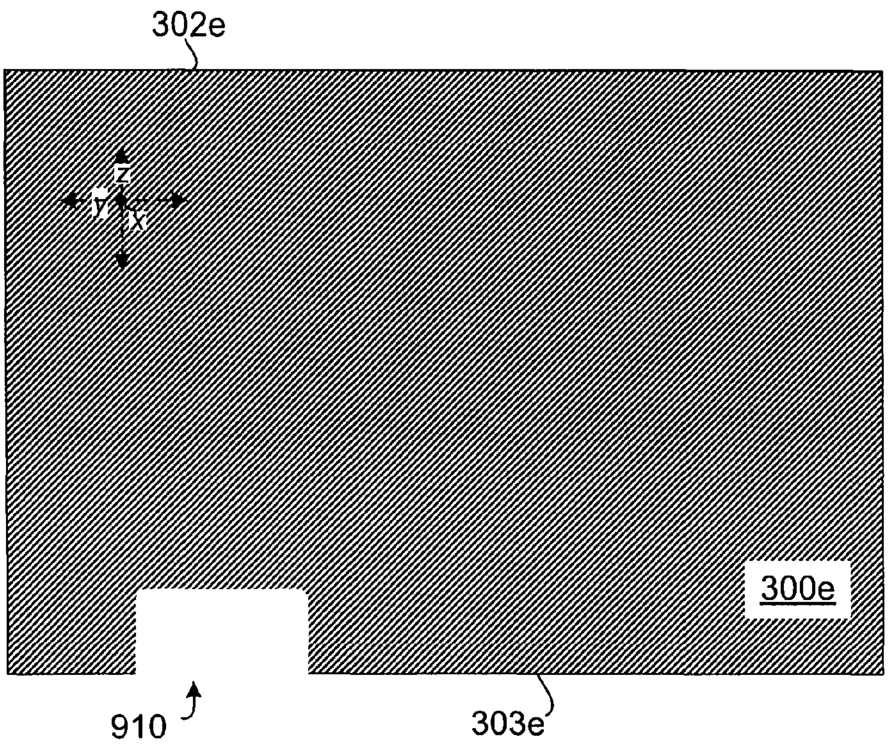
FIGS. 9*a*-9*b* illustrate a diagrammatic representation of cross-sectional views of an exemplary substrate in accordance with one exemplary embodiment.
Figure 9B:
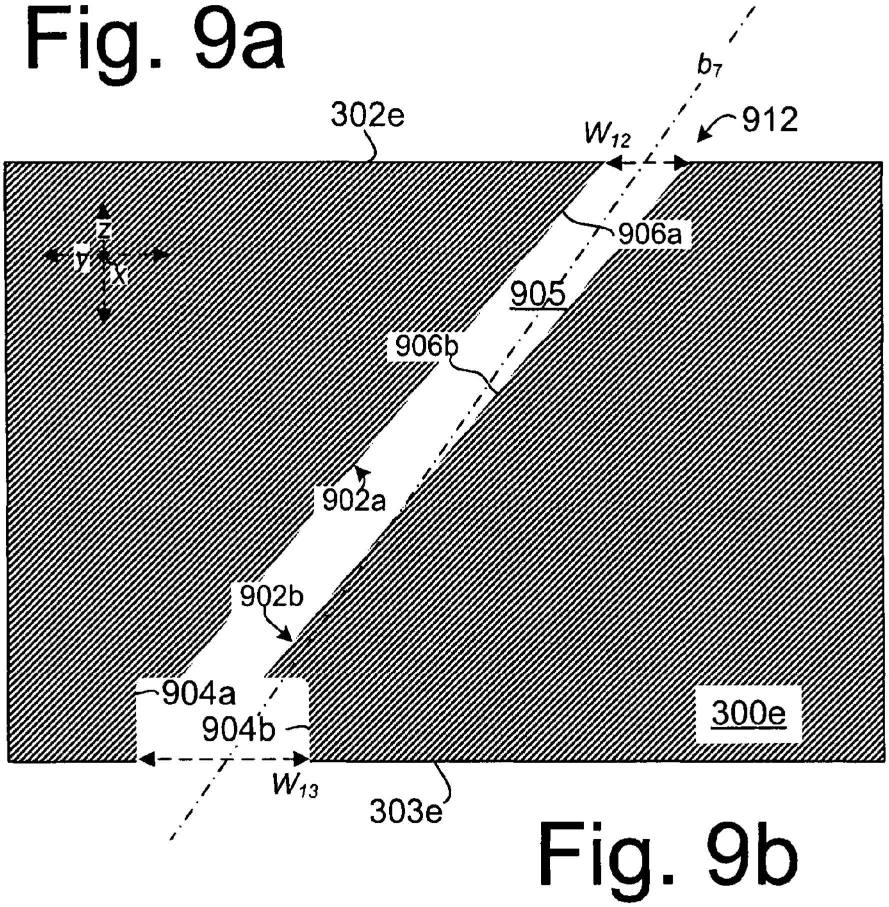

FIGS. 9*a*-9*b* represent cross-sectional views of substrate 300*e*. FIG. 9*a* represents an intermediary step in forming a feature in the substrate, while FIG. 9*b* represents feature 905 formed in substrate 300*e*. Feature 905 can be utilized as a fluid-handling slot or electrical interconnect, e.g. a via, among other uses. Feature 905 defines a bore axis $b_7$ which is not transverse first surface 302*e* and which intersects a midpoint of the feature width $w_{12}$, $w_{13}$ at the first surface 302*e* and the second surface 303*e* respectively.

Feature 905 is defined, at least in part, by one or more sidewalls. In this embodiment two sidewalls 902*a*, 902*b* are indicated. Also in this embodiment individual sidewalls 902*a*, 902*b* have a first sidewall portion 904*a*, 904*b* respectively that is generally transverse to first surface 302*e*. Further in this embodiment individual sidewalls 902*a*, 902*b* have a second different sidewall portion 906*a*, 906*b* that is not transverse the first surface.

Feature 905 can be formed with one or more substrate removal techniques. Examples of suitable substrate removal techniques are described below in relation to FIG. 11*a*-11*c*. One suitable formation method can involve removing substrate material from second surface 303*e* as indicated generally at 910. The substrate removal process indicated at 910 can form first sidewall portions 904*a*, 904*b*. The same removal process and/or one or more different removal processes can be utilized to remove substrate material indicated generally at 912. In this instance the sidewall removal process indicated generally at 912 can form sidewall portions 906*a*, 906*b*. The second removal process can be accomplished from either first surface 302*e*, second surface 303*e* or a combination thereof. Other embodiments may conduct the substrate removal process indicated at 912 before the substrate removal process indicated at 910.

Figure 10A:
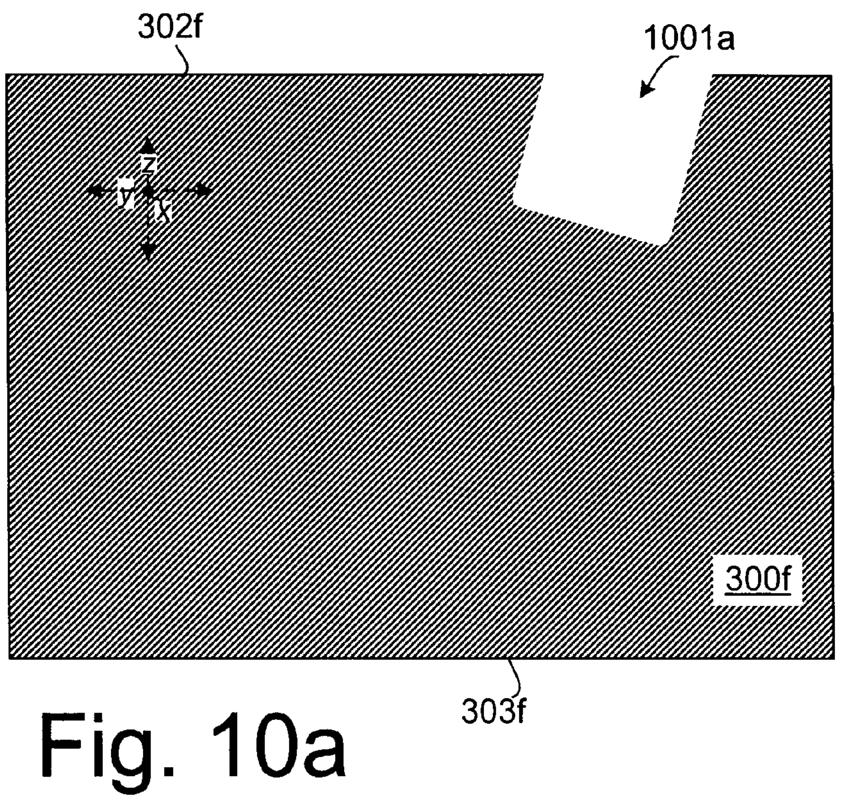
FIGS. 10*a*-10*b* illustrate a diagrammatic representation of cross-sectional views of an exemplary substrate in accordance with one exemplary embodiment.
Figure 10B:
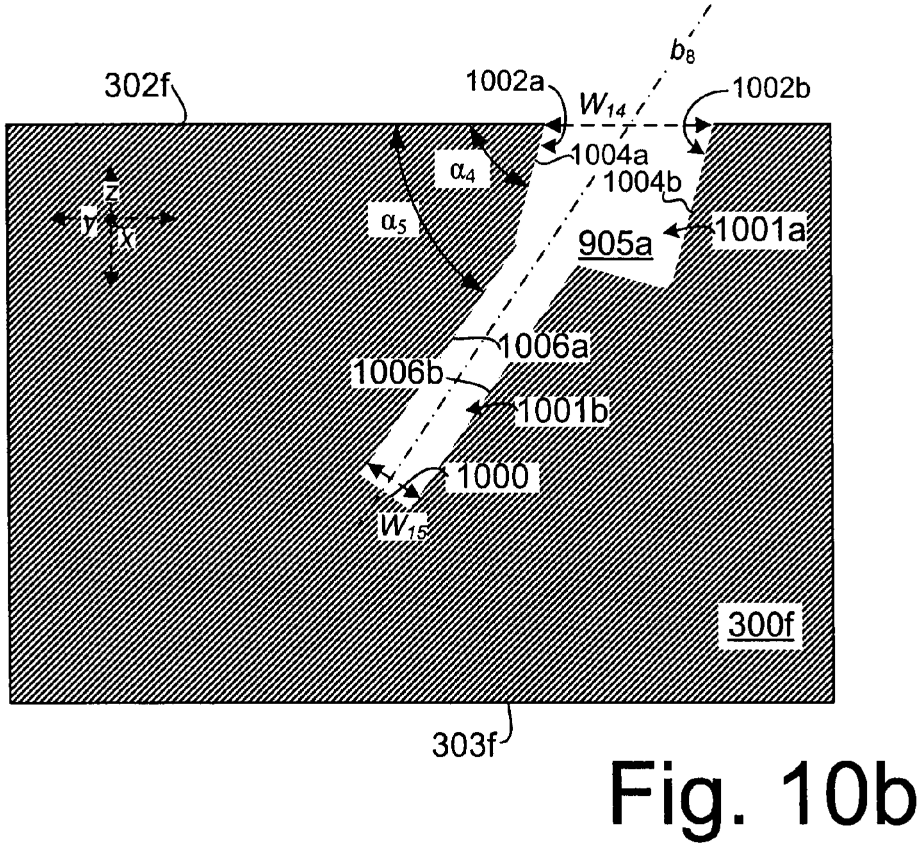

FIGS. 10*a*-10*b* show feature 905*a* formed in substrate 300*f*. Feature 905*a* defines a bore axis $b_8$ which is not transverse first surface 302*f* and intersects a midpoint of the feature width $w_{14}$, $w_{15}$ at the first surface 302*f* and at a bottom surface 1000 respectively. In this embodiment feature 905*a* can comprise a first region 1001*a* and a second region 1001*b*. In some embodiments the two regions 1001*a*, 1001*b* can be formed in distinct steps or as a single process.

Feature 905*a* can be defined, at least in part, by one or more sidewalls. In this embodiment two sidewalls 1002*a*, 1002*b* are indicated. Also in this embodiment individual sidewalls 1002*a*, 1002*b* have a first sidewall portion 1004*a*, 1004*b* respectively that is not transverse to first surface 302*f* and lies at a first angle $\alpha_4$ relative to first surface 302*f*. Further in this embodiment individual sidewalls 1002*a*, 1002*b* have a second different sidewall portion 1006*a*, 1006*b* respectively that is not transverse the first surface and which lies at a second different angle $\alpha_5$ relative to first surface 302*f*. These exemplary sidewall configurations can allow greater microdevice design flexibility.

Figure 11A:
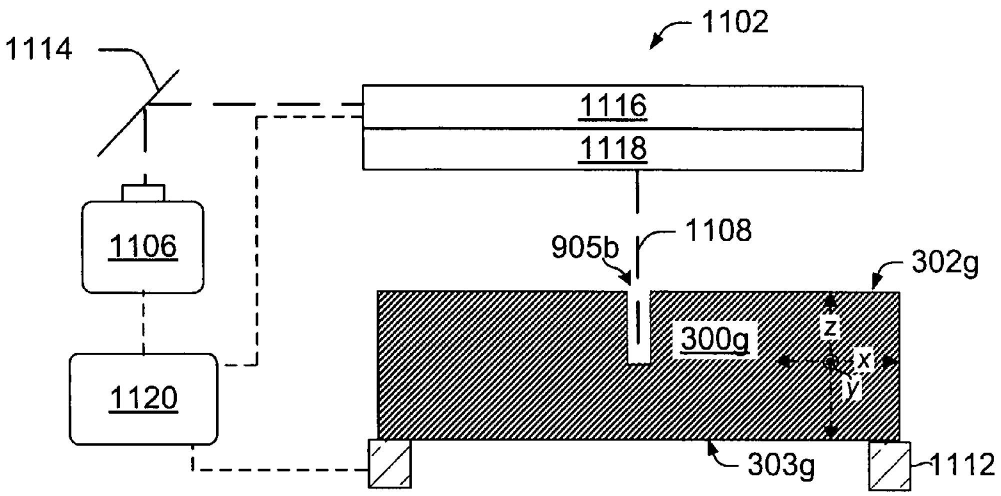
FIGS. 11*a*-11*c* illustrate process steps for forming an exemplary substrate in accordance with one exemplary embodiment.
Figure 11B:
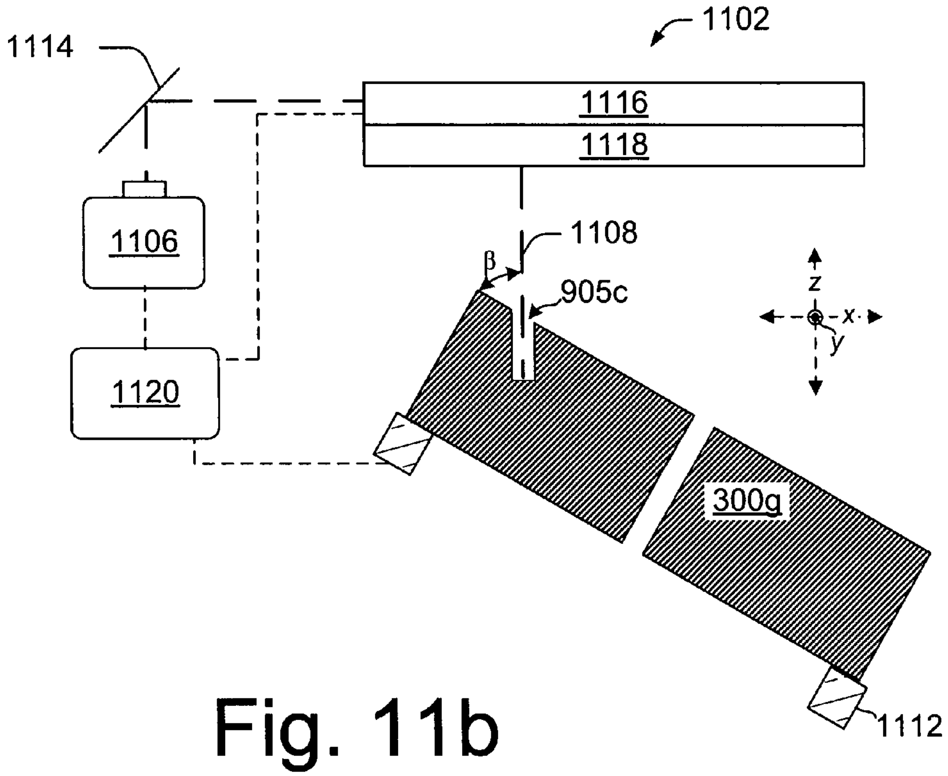
Figure 11C:
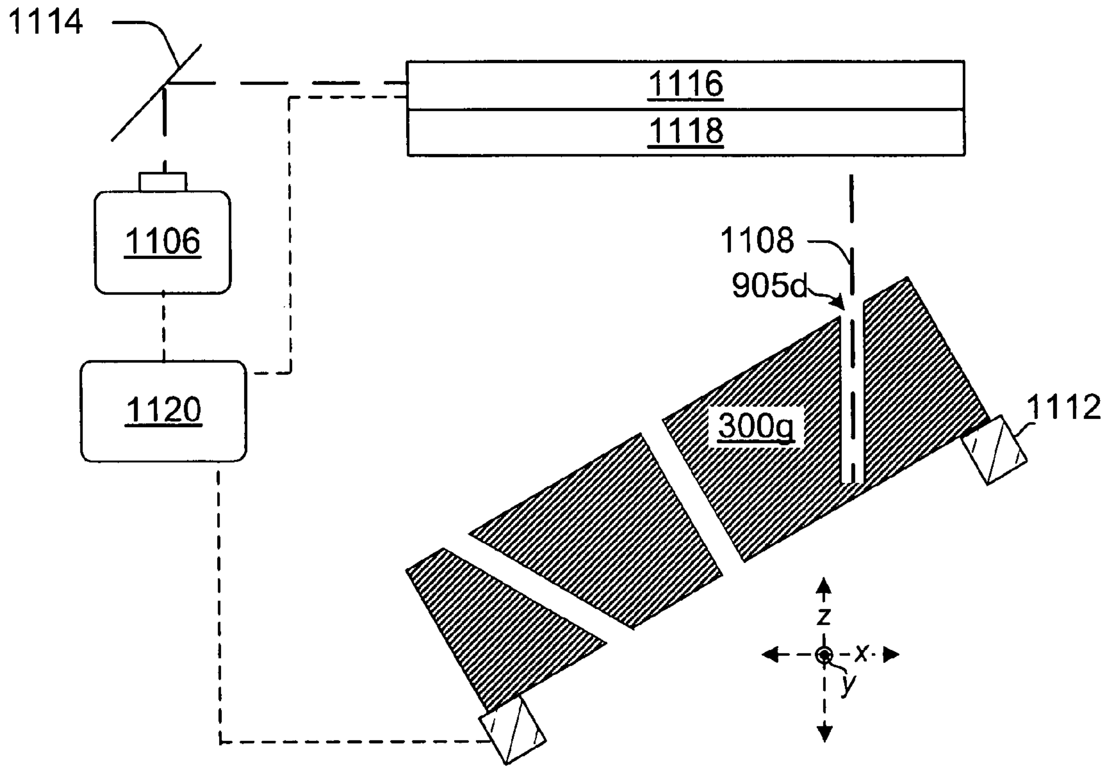

FIGS. 11*a*-11*c* show process steps for forming an exemplary feature in a substrate.

FIG. 11*a*, illustrates a laser machine 1102 for removing substrate material sufficient to form feature 905*b* in a substrate. Feature 905*b* generally can approximate a circle, an ellipsoid, a rectangle, or any other desired shape whether regular or irregular. For purposes of explanation, an individual substrate 300*g* is illustrated here. Other embodiments may act upon a wafer or other material which subsequently can be separated or can be diced into individual substrates.

In this embodiment, laser machine 1102 comprises a laser source 1106 configured to generate laser beam 1108 for laser machining substrate 300*g*. Exemplary laser beams such as laser beam 1108 can provide sufficient energy to energize substrate material at which the laser beam is directed. Energizing can comprise melting, vaporizing, exfoliating, phase exploding, ablating, reacting, and/or a combination thereof, among others processes. Some exemplary laser machines may utilize a gas assist and/or liquid assist process to aid in substrate removal.

In this embodiment substrate 300*g* is positioned on a fixture or stage 1112 for processing. Suitable fixtures should be recognized by the skilled artisan. Some such fixtures may be configured to move the substrate along x, y, and/or z coordinates.

Various exemplary embodiments can utilize one or more mirrors 1114, galvanometers 1116 and/or lenses 1118 to direct laser beam 1108 at first surface 302*g*. In some embodiments, laser beam 1108 can be focused in order to increase its energy density to machine the substrate more effectively. In these exemplary embodiments the laser beam can be focused to achieve a desired beam geometry where the laser beam contacts the substrate 300*g*.

Laser machine 1102 further includes a controller 1120 coupled to laser source 1106, stage 1112, and galvanometer 1116. Controller 1120 can comprise a processor for executing computer readable instructions contained on one or more of hardware, software, and firmware. Controller 1120 can control laser source 1106, stage 1112 and/or galvanometer 1116 to form feature 905*b*. Other embodiments may control some or all of the processes manually or with a combination of controllers and manual operation.

As illustrated in FIG. 11*a*, laser beam 1108 is forming feature 905*b* into substrate 300*g*. Feature 905*b* is formed with stage 1112 orienting substrate's first surface 302*g* generally transverse to laser beam 1108. Feature 905*b* extends along a bore axis which is generally transverse to first surface 302*g*. In this instance the bore axis of feature 905*b* can be represented by laser beam 1108 proximate the substrate.

FIG. 11*b* illustrates a subsequent process step where stage 1112 has repositioned substrate 300*g* to form feature 905*c*. In this embodiment stage 1112 can orient substrate 300*g* at an angle β less than 90 degrees relative to laser beam 1108. Various embodiments can utilize angles ranging from about 10 degrees to about 80 degrees. In some embodiments angle β can range from about 60 degrees to about 80 degrees. In other embodiments angle β can range from about 40 degrees to about 59 degrees. In still other embodiments angle β can range from about 20 degrees to about 39 degrees. In this particular embodiment angle β comprises about 70 degrees. During laser machining, adjustments can be made to stage 1112, lens 1118 and/or galvanometer 1116 to maintain focus of the laser beam on the substrate. This process can be utilized to form blind features and/or through features. Though FIG. 11*b* illustrates one exemplary configuration where stage 1112 and substrate 300*g* are angled relative to laser beam 1108, other exemplary configurations may angle the laser beam and/or laser machine relative to the substrate to achieve a desired orientation. Still other embodiments may angle both the laser beam and the substrate to achieve a desired orientation of the laser beam to the substrate.

FIG. 11*c* illustrates a further process step forming another feature 905*d*. Stage 1112 repositioned substrate 300*g* relative to laser beam 1108 to form feature 905*d* having a desired orientation. The skilled artisan should recognize other suitable configurations.

Although specific structural features and methodological steps are described, it is to be understood that the inventive concepts defined in the appended claims are not necessarily limited to the specific features or steps described. Rather, the specific features and steps are disclosed as forms of implementation of the inventive concepts.

What is claimed is:

1. A fluid ejection microdevice forming method comprising:

lasering a substrate comprising a first surface and a second surface substantially opposed to the first surface to remove substrate material from the substrate to form a first fluid slot therein, the first fluid slot extending along a first bore axis that is not transverse to the first surface of the substrate in a direction that is toward the second surface of the substrate and away from a third surface of the substrate; and lasering the substrate to remove substrate material from the substrate to form a second fluid slot therein, the second fluid slot extending along a second bore axis that is not transverse to the first surface in a direction that is toward the second and third surfaces of the substrate;

at least one of the first fluid slot and the second fluid slot comprising a first set of sidewalls disposed at a first non-transverse angle from the first surface and a second set of sidewalls disposed at a second non-transverse angle from the first surface, the first non-transverse angle being different from the second non-transverse angle.

2. The method of claim 1, wherein the lasering comprises laser machining the substrate at least in part by directing a laser beam at the substrate at a first angle relative to the first surface and then directing the laser beam at a second different angle relative to the first surface.

3. The method of claim 1, wherein the lasering comprises laser machining the substrate at least in part by directing a laser beam at the substrate at a first angle relative to the first surface and from a direction sufficient to contact the first surface before contacting a second surface and then directing the laser beam at a second different angle relative to the first surface and from a direction sufficient to contact the second surface before contacting the first surface.

4. The method of claim 1, wherein the lasering comprises directing a laser beam at the first surface so that the laser beam is oriented at an angle in a range of about 10 degrees to about 80 degrees relative to the first surface.

5. The method of claim 1, wherein the lasering comprises directing a laser beam at the first surface so that the laser beam is oriented at an angle in a range of about 60 degrees to about 80 degrees relative to the first surface.

6. The method of claim 1, wherein the lasering comprises directing a laser beam at the first surface so that the laser beam is oriented at an angle in a range of about 40 degrees to about 59 degrees relative to the first surface.

7. The method of claim 1, wherein the lasering comprises directing a laser beam at the first surface so that the laser beam is oriented at an angle in a range of about 20 degrees to about 39 degrees relative to the first surface.

8. The method of claim 1 further including executing computer readable instructions that control a laser beam for lasering the substrate and cause the laser beam to form the first and second fluid slots in the substrate.

9. The method of claim 1, further comprising removing substrate material from said second substrate surface of said substrate by lasering which in combination with lasering substrate material from the first surface forms the first and second fluid slots.

10. The method of claim 9, wherein, during formation of at least one of said fluid slots, said substrate material is removed from the second substrate surface prior to removing substrate material from the first surface.

11. The method of claim 9, wherein the lasering includes laser machining.

12. A method of forming an ink jet print head having a substrate that includes a first substrate surface and a generally opposing second substrate surface, the method comprising:

forming a first fluid handling slot in the substrate by using a laser beam to remove substrate material along a first bore axis that is not transverse to the first substrate surface, is not parallel to the first substrate surface, and extends toward the second substrate surface in a direction that is away from a third surface of the substrate;

forming a second fluid handling slot in the substrate with said laser beam, the second fluid handling slot being formed by using the laser beam to remove substrate material along a second bore axis that is not transverse to the first substrate surface, is not parallel to the first substrate surface, and extends toward the second substrate surface in a direction that is toward the third substrate surface;

at least one of the first fluid handling slot and the second fluid handling slot being formed with a first set of sidewalls disposed at a first non-transverse angle from the first surface and a second set of sidewalls disposed at a second non-transverse angle from the first surface, the first non-transverse angle being different from the second non-transverse angle;

positioning a thin film layer over the second substrate surface;

positioning a barrier layer over the thin film layer that defines at least one firing chamber; and, forming at least one firing nozzle in an orifice layer positioned over the barrier layer.

13. The method of claim 12 wherein said third substrate surface comprises a sidewall surface of the substrate, and wherein forming the first and second fluid handling slots in the substrate includes lasering with the laser beam into the third surface of the substrate to form one of the first and second fluid handling slots.

14. The method of claim 12, further including controlling the laser beam with computer readable instructions that direct the laser beam along the first and second bore axes that are not transverse to the first substrate surface to form the first and second fluid handling slots.

15. The method of claim 12, further including:

lasering the substrate with the laser beam to form multiple fluid handling slots in the substrate between the first substrate surface and the second substrate surface;

where lasering of the first substrate surface defines a first footprint having a first area; and where lasering of the second substrate surface defines a second footprint having a second area that is different than the first footprint.

16. The method of claim 12 where the orifice layer is formed to include the barrier layer as one component.

17. The method of claim 12, wherein the third substrate surface comprises a sidewall and wherein a first portion of the sidewall is generally transverse the first substrate surface and a second different portion of the sidewall is not transverse the first substrate surface.

18. The method of claim 12, further comprising controlling the laser beam to form at least one of the first and second fluid slots with a cross-sectional area that approximates an ellipsoid or a rectangle at the first substrate surface.

19. The method of claim 12, further comprising controlling the laser beam to remove the substrate material where each of the first and second fluid handling slots extends between and through the first substrate surface and the second substrate surface.

20. A method of forming an ink jet print head having a substrate that includes a first substrate surface and a generally opposing second substrate surface, the method comprising:

executing computer readable instructions for controlling a laser beam;

generating the laser beam in response to the executing computer readable instructions;

directing the laser beam, in response to the executing computer readable instructions, onto the substrate to form a first fluid handling slot in the substrate where the laser beam removes substrate material, the laser beam being directed to form the first fluid handling slot along a first bore axis of the substrate that is not transverse to the first substrate surface, is not parallel to the first substrate surface, and extends toward the second substrate surface in a direction that is away from a third surface of the substrate;

directing the laser beam, in response to the executing computer readable instructions, onto the substrate to form a second fluid handling slot in the substrate where the laser beam removes substrate material, the laser beam being directed to form the second fluid handling slot along a second bore axis of the substrate that is not transverse to the first substrate surface, is not parallel to the first substrate surface, and extends toward the second substrate surface in a direction that is toward the third surface of the substrate;

at least one of the first fluid handling slot and the second fluid handling slot being formed with a first set of sidewalls disposed at a first non-transverse angle from the first surface and a second set of sidewalls disposed at a second non-transverse angle from the first surface, the first non-transverse angle being different from the second non-transverse angle;

positioning a barrier layer over the second substrate surface that defines at least one firing chamber where the at least one firing chamber is in fluid communication with the first and second fluid handling slots; and, forming at least one firing nozzle in an orifice layer and positioning the orifice layer over the barrier layer where the at least one firing nozzle is in fluid communication with the at least one firing chamber.

* * * * *